US007432676B2

(12) United States Patent

Keller et al.

(10) Patent No.: US 7,432,676 B2
(45) Date of Patent: Oct. 7, 2008

(54) BARRIER MOVEMENT OPERATOR HAVING OBSTRUCTION DETECTION

(75) Inventors: Robert Keller, Chicago, IL (US); Colin Willmott, Buffalo Grove, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 11/565,344

(22) Filed: Nov. 30, 2006

(65) Prior Publication Data

US 2007/0090781 A1 Apr. 26, 2007

Related U.S. Application Data

(63) Continuation of application No. 10/760,069, filed on Jan. 16, 2004, now Pat. No. 7,205,735.

(51) Int. Cl.
*H02P 1/00* (2006.01)

(52) U.S. Cl. ....................... 318/266; 318/268; 318/286; 318/466; 318/468

(58) Field of Classification Search ................. 318/266, 318/268, 286, 466, 468, 280, 282
See application file for complete search history.

(56) References Cited

U.S. PATENT DOCUMENTS

| | | | | |
|---|---|---|---|---|
| 4,706,727 | A | 11/1987 | Leivenzon et al. | |
| 5,222,327 | A | 6/1993 | Fellows et al. | |
| 5,278,480 | A | 1/1994 | Murray | |
| 5,334,876 | A | 8/1994 | Washeleski et al. | |
| 5,335,307 | A | 8/1994 | Sommer | |
| 5,557,887 | A | 9/1996 | Fellows et al. | |
| 6,014,307 | A | 1/2000 | Crimmins | |
| 6,091,271 | A * | 7/2000 | Pant et al. | 327/122 |
| 6,137,255 | A | 10/2000 | Skalski | |
| 6,172,475 | B1 | 1/2001 | Fitzgibbon et al. | |
| 6,326,751 | B1 * | 12/2001 | Mullet et al. | 318/434 |
| 6,952,087 | B2 | 10/2005 | Lamm | |
| 7,205,735 | B2 | 4/2007 | Keller et al. | |
| 2005/0012488 | A1 | 1/2005 | Fitzgibbon et al. | |

OTHER PUBLICATIONS

International Search Report dated Aug. 27, 2004 in PCT Patent Application No. PCT/US04/01157.

* cited by examiner

*Primary Examiner*—Karen Masih
(74) *Attorney, Agent, or Firm*—Fitch, Even, Tabin & Flannery

(57) ABSTRACT

A barrier movement operator includes an A.C. motor having a rotatable rotor connected to a barrier for movement thereof. A sensing apparatus generates motor signals representing an operational variable of the motor. The movement of the barrier is controlled by a controller, which responds to the motor signals by selectively stopping rotation of the rotor or reversing the rotation of the rotor. A power control arrangement provides energizing power to the motor by receiving AC power input substantially in the form of a sine wave and conducts portions of successive cycles of the sine wave of the received AC power to the motor to enhance the sensed operational variable to torque characteristic of the motor.

5 Claims, 8 Drawing Sheets

BARRIER MOVEMENT OPERATOR HAVING OBSTRUCTION DETECTION

CROSS-REFERENCES TO RELATED APPLICATIONS

This is a continuation of application Ser. No. 10/760,069 entitled "Barrier Movement Operator Having Obstruction Detection" filed Jan. 16, 2004 now U.S. Pat. No. 7,205,735 having inventors Robert Keller and Colin Willmott and which is incorporated herein by reference in its entirety.

BACKGROUND

The present invention relates to barrier movement operators and particularly to barrier movement operators having improved characteristics for detecting obstructions to the movement of the barrier.

Barrier movement operators generally comprise an electric motor coupled to a barrier and a controller which responds to user input signals to selectively energize the motor to move the barrier. The controller may also respond to additional input signals, such as those from photo-optic sensors sensing an opening over which the barrier moves, to control motor energization. For example, should a photo optic sensor detect an obstruction present in the barrier opening, the controller may respond by stopping and/or reversing motor energization to stop and/or reverse barrier movement. The controller may also respond to motor speed representing signals by controlling motor energization. Such may be used to stop and/or reverse the movement of a barrier when the motor speed, which represents the speed of movement of the barrier, falls below a predetermined amount as might occur if the barrier has contacted an obstruction to its movement.

Detecting contact by the barrier with an obstacle by sensing the driving speed of the motor has certain inherent difficulties. The barrier, barrier guide system and the connection between the barrier and the motor all have momentum and all exhibit some amount of flexibility. When the leading edge of a barrier is slowed, it takes time for the inertia of the various parts to be overcome and for the slowing of the barrier to be reflected back to the motor via the flexible (springy) interconnection. Through proper design and construction techniques, such systems have been successfully achieved for response times and contact pressure thresholds to achieve safe operation. However, to achieve ever safer operation involving lower barrier contact forces and more rapid response times, new designs are needed.

Motors for use with barrier movement operators are generally constructed or selected to operate efficiently and exhibit a motor rotation rate (motor speed) to torque characteristic represented in FIG. 4. The normal forces on the barrier generally allow the operating motor speed between the marks labeled A and B on FIG. 4 resulting in a relatively flat slope of the speed versus torque characteristic. The "normal" motor having a characteristic as shown in FIG. 4 exhibits a change of motor RPM of approximately 20 RPM per inch-pound of required motor torque. Improvements in obstruction contact times and reduction of obstruction contact forces is difficult with a motor having the characteristics of FIG. 4 because the change of motor RPM is small for the normal range of obstruction forces. A need exists for a motor which operates with a torque to speed characteristic which is enhanced for rapid obstacle detection.

Improvements in barrier contact obstacle detection may also be achieved by improvements in how sensed motor speed changes are interpreted. Existing barrier movement systems include obstacle detection functions which compare currently measured motor speed with an obstacle indicating threshold. The obstacle indicating threshold generally consists of an expected motor speed minus a constant which defines how much additional speed reduction represents an obstacle rather than a normal variation in operating speed. In some systems an average speed is assumed for the entire movement between open and closed positions and when motor speed falls below the normal speed minus a fixed threshold an obstacle is assumed. In other systems a speed history is determined for door movement by recording measured speeds at several (many) points along barrier travel. When the measured speed falls below the speed history for the same point in barrier travel minus a fixed threshold, an obstacle is assumed. Improvements are needed in obstacle detection to permit fine control of speed changes which indicate an obstruction.

DESCRIPTION

Figure 1:
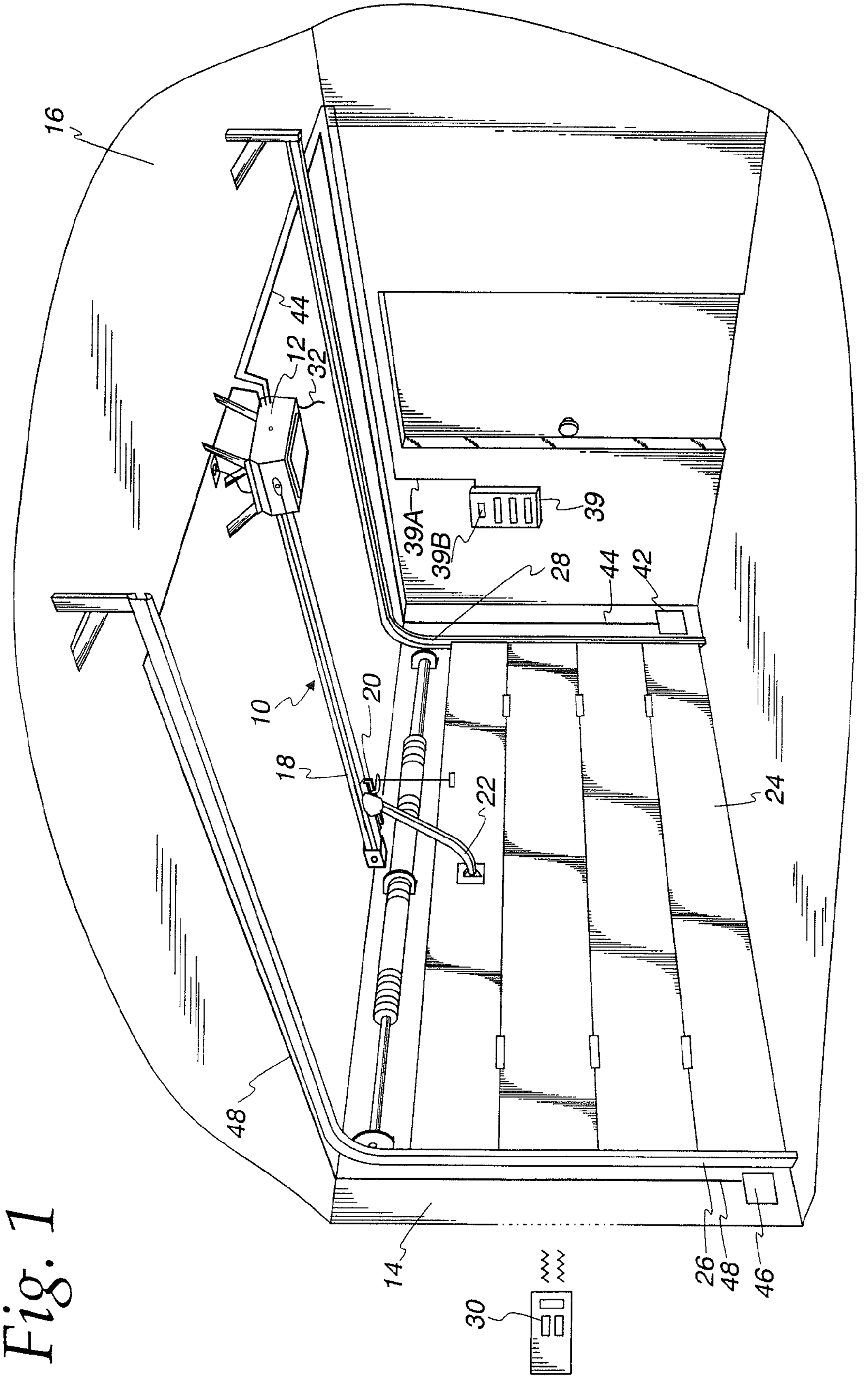
FIG. 1 shows a barrier movement system connected to a vertically moving garage door.

FIG. 1 illustrates the use of a barrier movement operator 10 for vertically moving a garage door. It should be understood that a barrier movement operator as described and claimed herein may be used to move other types of barrier such as gates, window shutters and the like. Barrier movement operator 10 includes a head unit 12 mounted within a garage 14. The head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to a receiver as will appear hereinafter. A switch module 39 is mounted on a wall of the garage. The switch module 39 is connected to the head unit by a pair os wires 39*a* and includes a command switch 39*b*. An optical emitter 42 is connected via a power and signal line 44 to the head unit. An optical detector 46 is connected via a wire 48 to the head unit 12.

Figure 2:
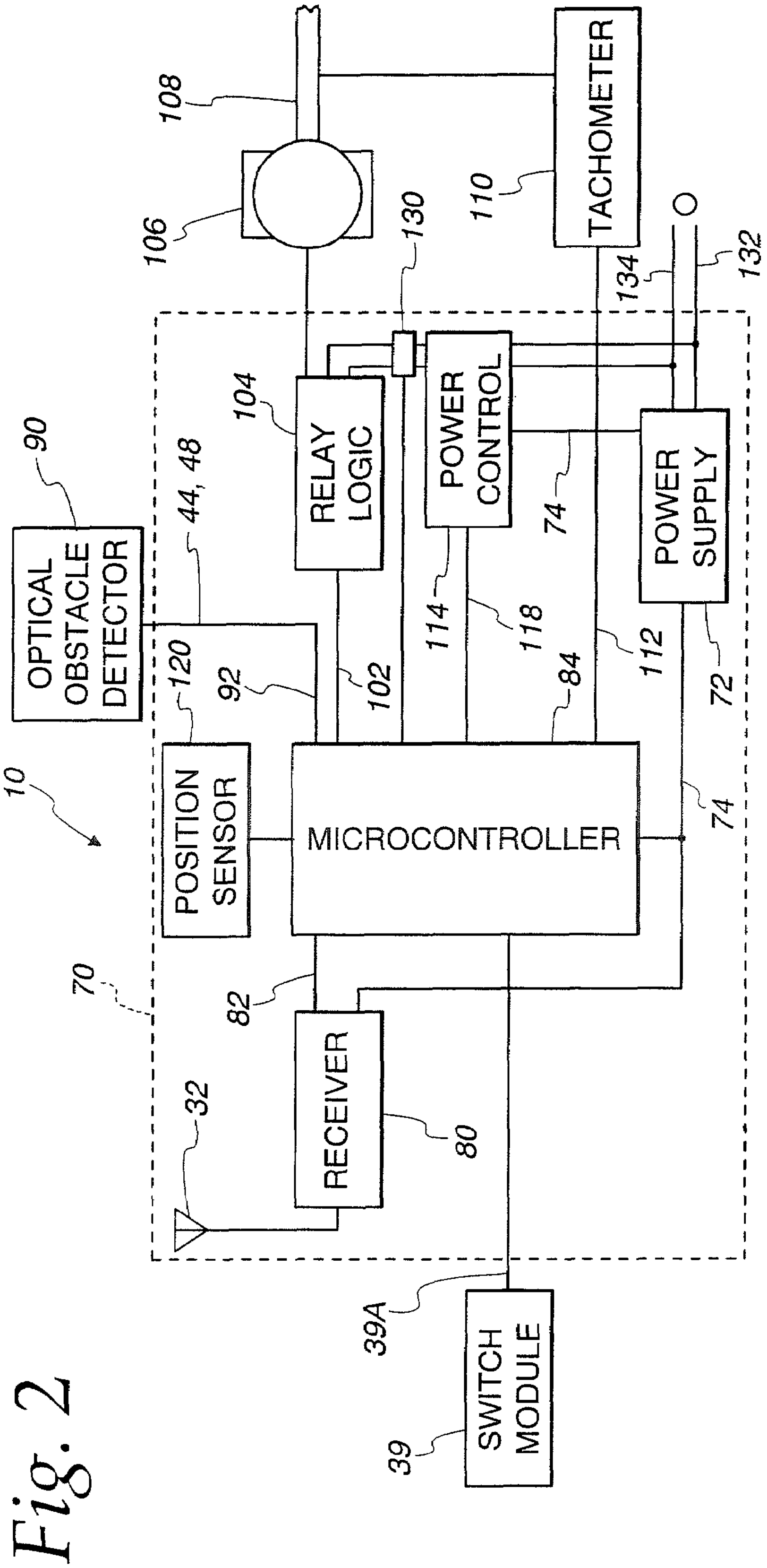
FIG. 2 is a block diagram of the control apparatus for a barrier movement operator.
Figure 3:
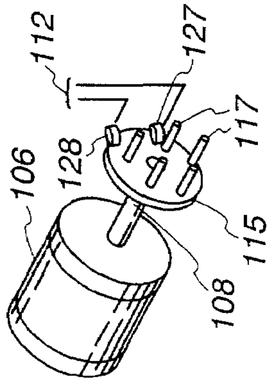
FIG. 3 illustrates circuitry for detecting motor rotation speed.

As shown in FIG. 2, the garage door operator 10, which includes the head unit 12 has a controller 70 which includes the antenna 32. The controller 70 includes a power supply 72 which receives alternating current from an alternating current source, such as 110 volt AC, at a pair of conductors 132 and 134, and converts the alternating current into DC which is fed along a line 74 to a number of other elements in the controller 70. The controller 70 includes and rf receiver 80 coupled via a line 82 to supply demodulated digital signals to a microcontroller 84. The microcontroller 84 includes a non-volatile memory, which non-volatile memory stores set points and other customized digital data related to the operation of the control unit. An obstacle detector 90, which comprises the infrared emitter 42 and detector 46 is coupled via a bus 92 (which comprises lines 44 and 48) to the microcontroller. The obstacle detector bus 92 includes lines 44 and 48. The wall switch 39 is connected to supply signals to and is controlled by the microcontroller. The microcontroller, in response to switch closures, will send signals over a relay logic line 102 to a relay logic module 104 which connects power to an alternating current motor 106 having a power take-off shaft 108. A tachometer 110 is connected to shaft 108 and provides a tachometer signal on a tachometer line 112 to the microcontroller 84. The tachometer signal being indicative of the speed of rotation of the motor. The tachometer 110 may comprise an interrupter wheel represented at 115 (FIG. 3) connected to rotate with the motor shaft 108. A light source 128 and light receiver 127 detect rotation of the shaft by detecting successive passings of a plurality of light blocking apparatuses 117 and reporting to controller 84 via communication path 112. Microcontroller 84 can then determine current motor speed by calculating the period between successive light blockages. It should be mentioned that other means for detecting rotation rate may also be employed such as a cup shaped interrupter with equally spaced apertures therethrough to successively block and pass light between source 128 and detector 127. The signals on conductor 112 from tachometer 110 may also be used to identify the position of the barrier when used with a pass point arrangement or position detector shown at 120, which operation is known in the art.

The barrier movement operator of FIG. 1 begins to move the barrier in response to a user pressing button 39B of wall control 39 or pressing a transmit button of transmitter 30. Generally, when movement begins the barrier is in the open or closed positions. When a command to move the barrier is received, the barrier driven toward the other limit. In the present embodiment the controller 10 tracks the position of the barrier in response to signals from tachometer 110 and formulates operations based on that sensed position. The controller also may respond to signals from optical detector 90 representing a possible obstruction by reversing the direction of a downwardly traveling barrier.

Figure 4:
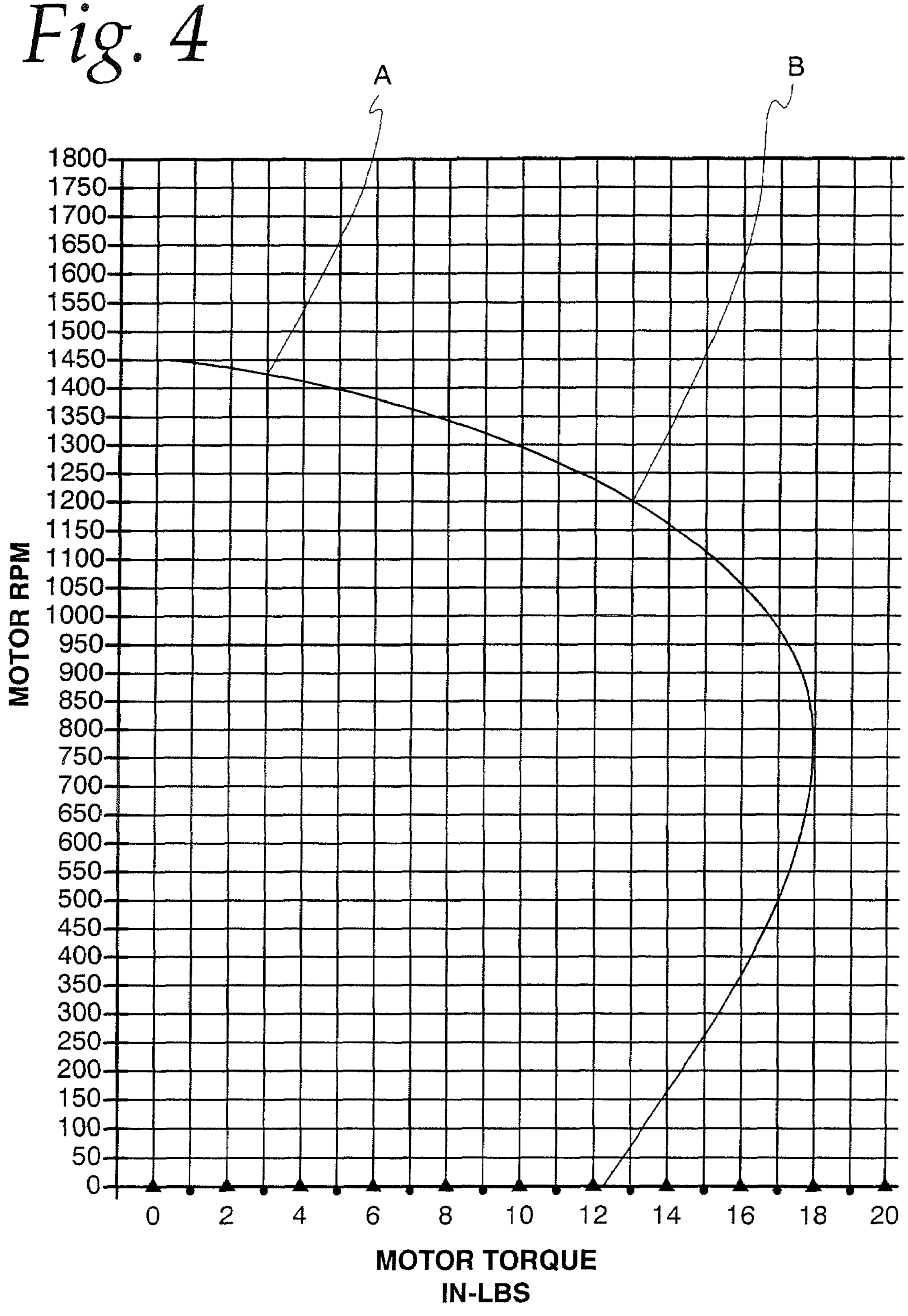
FIG. 4 is a graph of motor rotation speed versus required motor torque for existing induction A.C. motors.

The barrier movement operator of FIG. 1 also responds to sensed information about the forces required to move the barrier to control further barrier movement. For example, as the barrier is moved, motor speed is continuously checked as an indication of the forces being required to move the barrier. FIG. 4 is a graph of a normal motor showing motor rotation speed versus motor output torque. As the forces required to move the door increase the motor slows. The converse is also true. The predictable nature of speed change versus applied forces allows the motor speed to be used as an indication of such things as the barrier contacting an obstruction.

Figure 7:
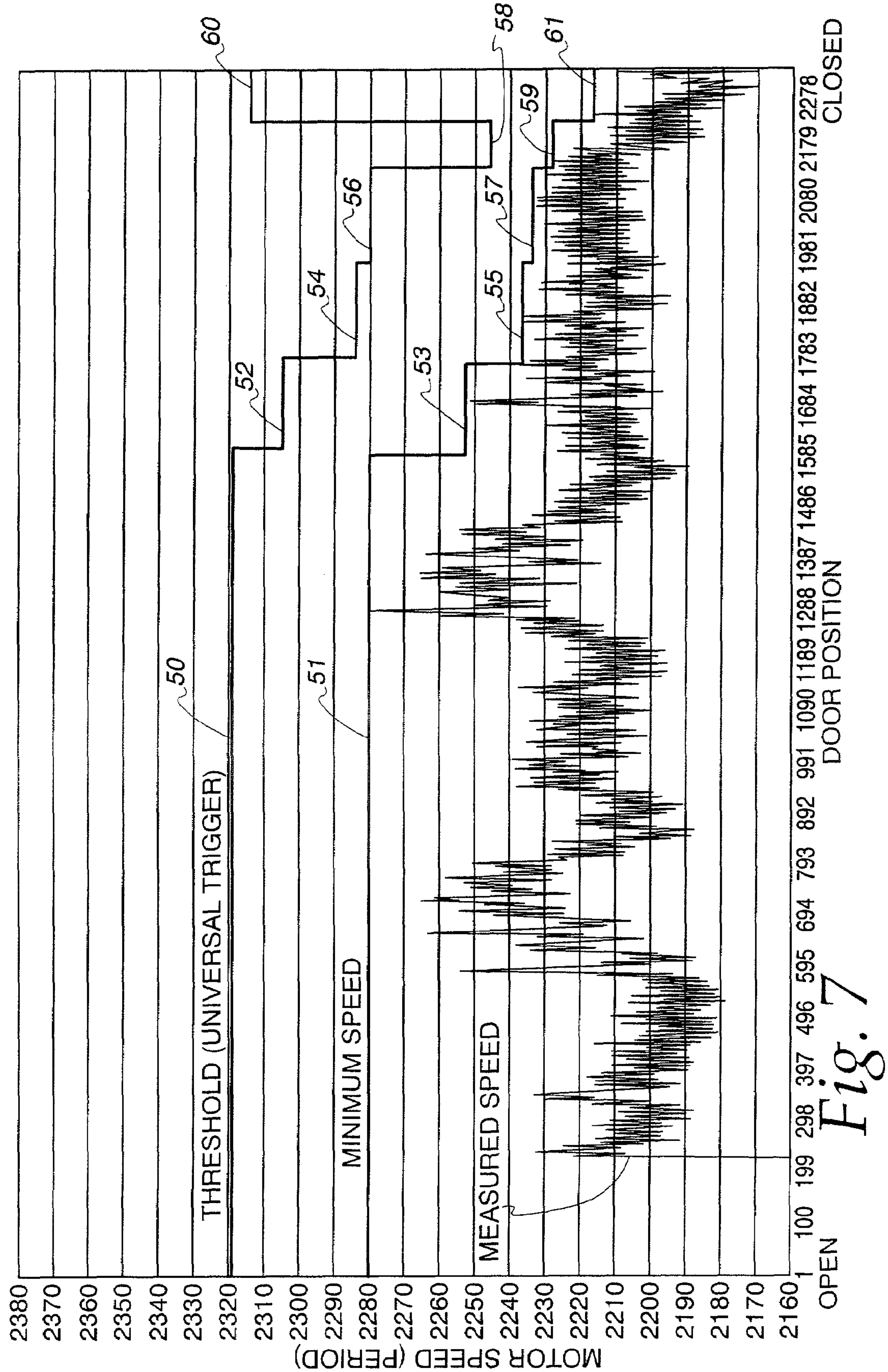
FIG. 7 is a graph representing motor speed and obstacle detection thresholds.

Barrier movement operators have been constructed which respond to the motor speed falling below a fixed value by assuming that the barrier has contacted an obstruction and, accordingly, stop or reverse the travel of the barrier. More sophisticated systems have been designed which record measured motor speed at a number of barrier positions establish obstruction threshold histories for different barrier positions. FIG. 7 illustrates one such thresholding system in which 6 thresholds labeled 50, 52, 54, 56, 58 and 60 are shown. It should be mentioned that in FIG. 7 motor speed is represented by the period between successive light blockages from an interrupter wheel and as such higher on the graph of FIG. 7 represents lower motor speed. During movement of the barrier, a number of different motor speeds are sensed as represented by the measured speed line. Zones of interest are then selected and a value representing the minimum speed in each zone is recorded. In FIG. 7, the minimum speed in a first zone is represented at 51, a second at 53 and others at 55, 57, 59 and 61. A predetermined speed difference value may then be subtracted from each minimum speed to establish the overall threshold for the zone. The references 50, 52, 54, 56, 58 and 60 represent the per zone thresholds. After the zone thresholds have been learned (or updated) whenever measured speed falls below the zone threshold an obstruction is assumed and the barrier is stopped or reversed.

As shown in FIG. 7 each minimum threshold is a fixed amount different from the minimum speed in the zone as represented by the couplets 50-51, 52-53, 54-55 and 56-57. In the present embodiment, particular zones can be configured to be more sensitive than other zones. For example, the period (speed) difference between 57 and 56 is the same as the period (speed) difference between all other couplets toward the open representing left of the graph. Thus, all zones from 56-57 to the left are of substantially equal sensitivity. The zone represented by the couplet 58-59 is more sensitive because less speed difference between the measured minimum 59 and the threshold 58 exists than between the other couplet to the left. As can be seen in FIG. 7 the most sensitive zone is near the closed position and advantageously is placed within 18 inches of the closed position.

Figure 5:
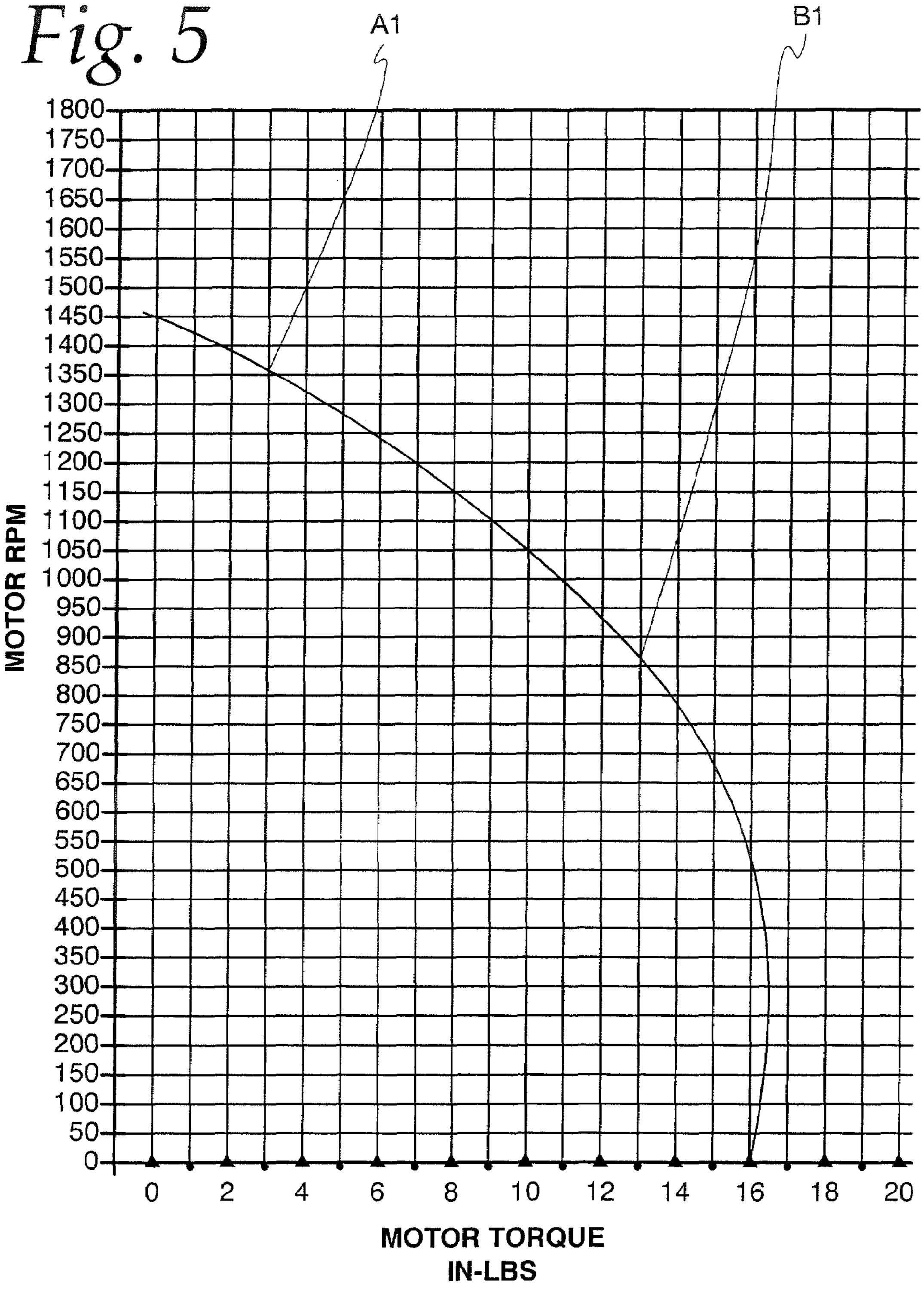
FIG. 5 is a graph of motor rotation speed versus required motor torque for enhanced A.C. induction motor operation.

Other improvements to obstruction detection are made by the presently disclosed barrier movement system. FIG. 4 represents the speed versus torque characteristic for a normal motor. As can be seen the slope of the line from A to B which represents a normal operating range, an increase of required torque of one ft. lb. results in a motor speed change of only about 12-13 RPM. This is a relatively small change to be rapidly detected, particularly in the real environment as represented by the measured speed line of FIG. 7. FIG. 5 represents in the speed versus torque characteristic of a motor and its driving apparatus which is enhanced to improve motor speed change. The slope of the line between points A1 and B1 on FIG. 5 results in a change of speed of approximately 47 to 48 RPM per inch-pound of torque thus making speed changes more easily detected.

Figure 8A:
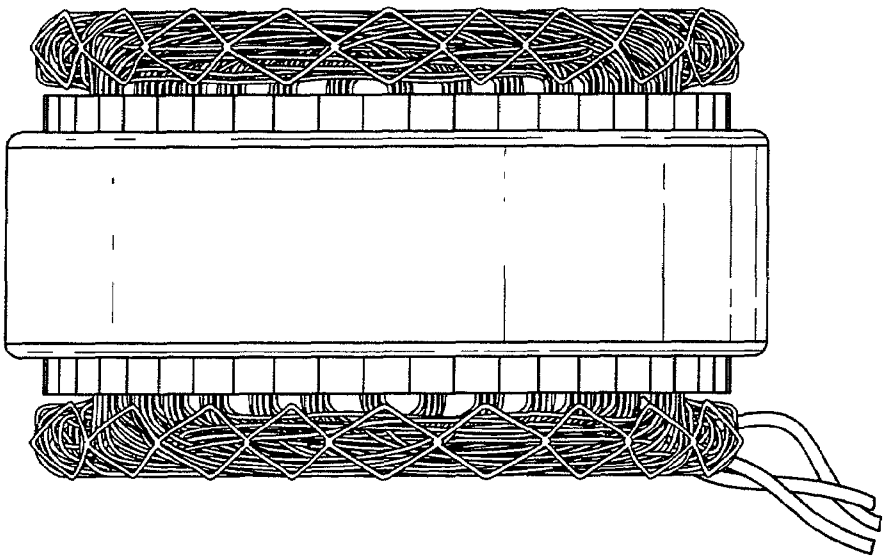
FIGS. 8A and B represent the stator and field windings of an A.C. induction motor.
Figure 8B:
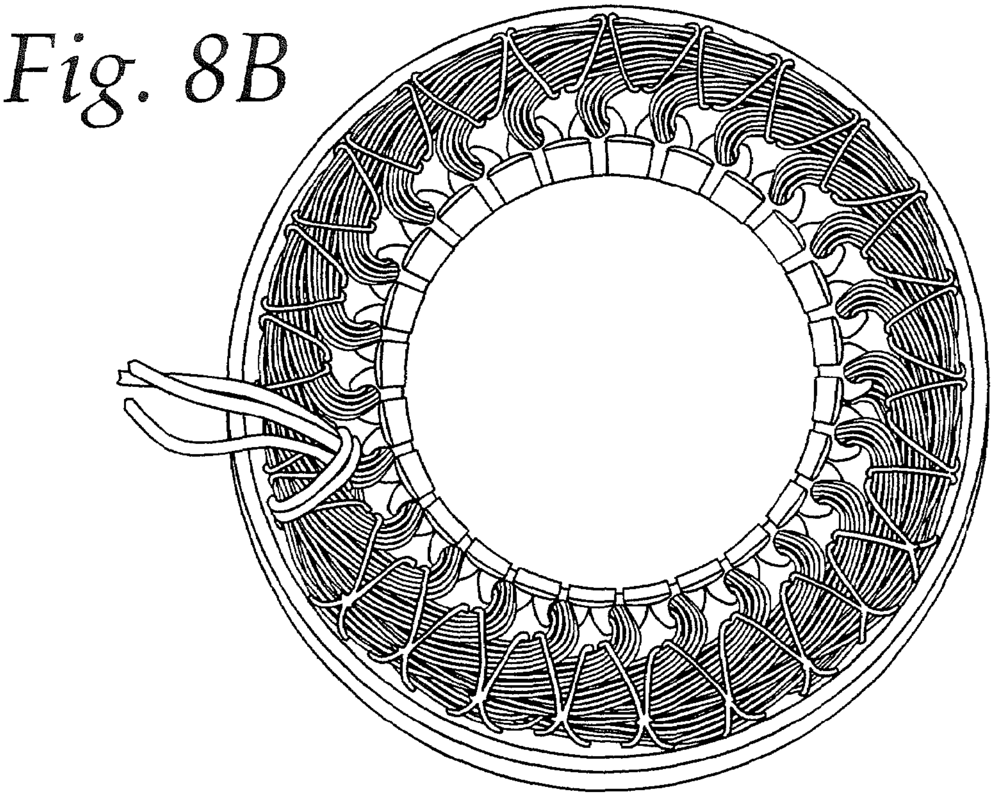
Figure 9A:
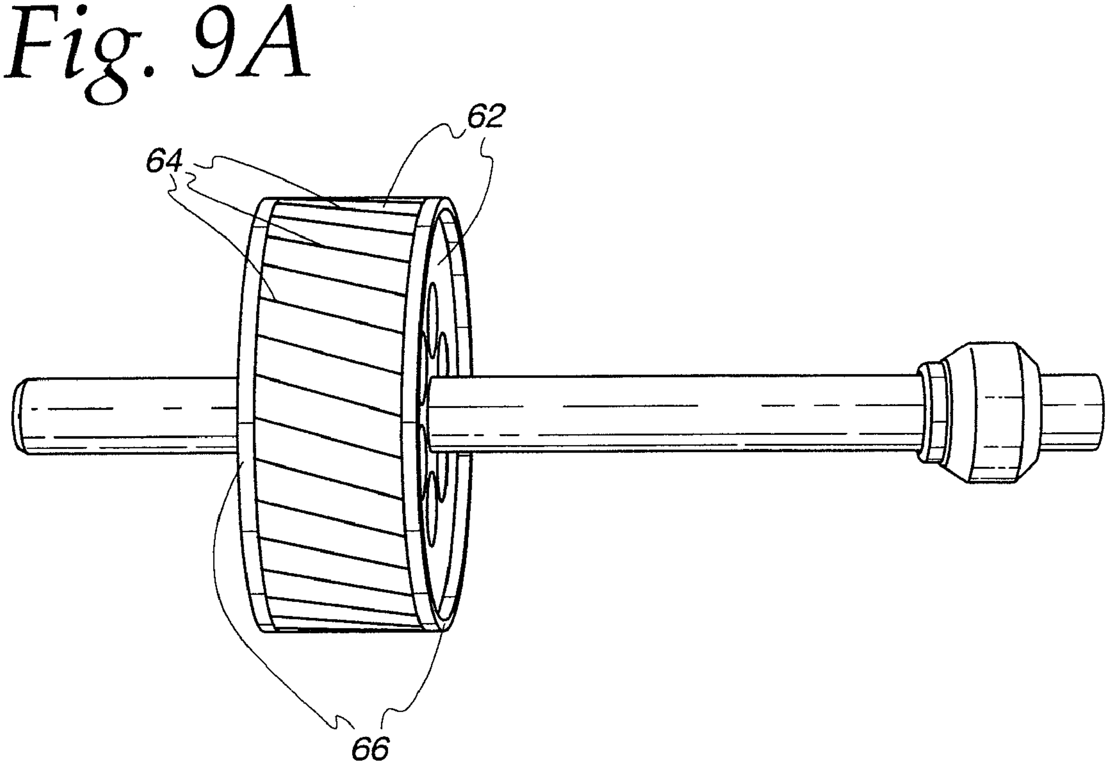
FIGS. 9A and B represent the rotor of an A.C. induction motor.
Figure 9B:
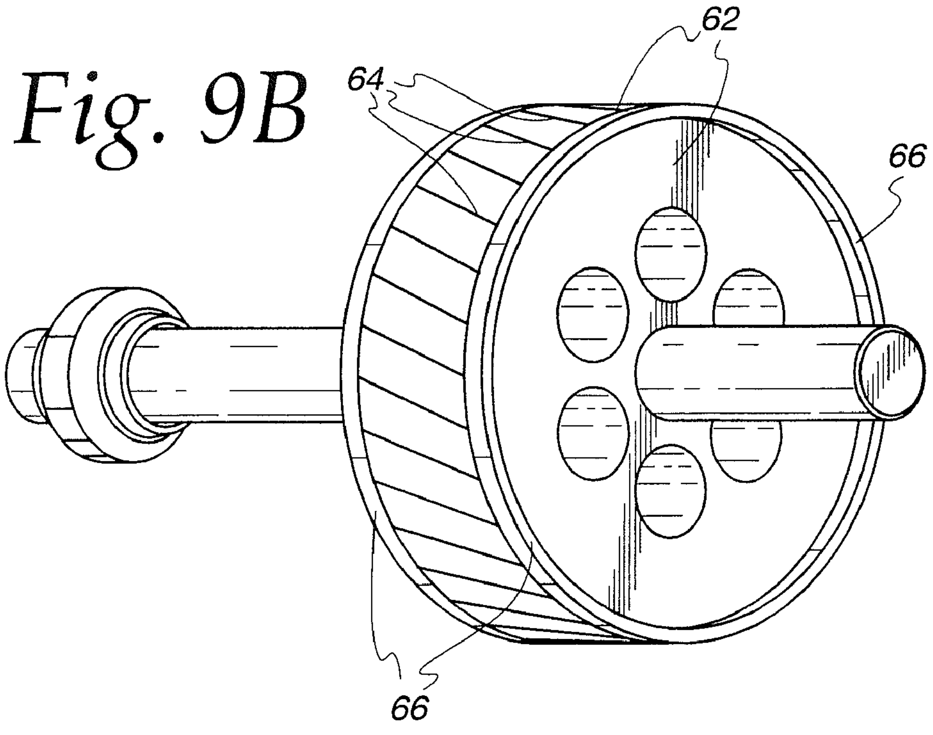

A characteristic as shown in FIG. 5 can be achieved by producing a motor with the appropriate parameters. FIGS. 8A and 8B are views of a field winding/stator of an induction motor. FIGS. 9A and 9B represent the induction rotor of such a motor. The rotor of an AC induction motor includes a plurality of ferris metal rotor lamination formed together into a cylinder as represented at 62. The rotor laminations have a plurality of regularly spaced apertures which are arranged to extend from one end of the rotor cylinder at an angle as represented by 64. The apertures are filled with an electrically conductive non-ferris metal such as aluminum. Finally end rings 66 are formed at the ends of the diagonal conductive lines 64 from non-ferris electrical conductors to provide conductive paths between the diagonals 64. Due to current induced by AC applied to the field coils, magnetic fields are produced in the rotor which cause rotation.

Normally motors are designed to provide very low resistance in the cross paths 64 and the end rings 66 resulting in a characteristic as shown in FIG. 4. In the present embodiment, however, the resistances have been increased which results in an enhanced characteristic as shown in FIG. 5. In a preferred embodiment the resistance increase was produced by using smaller than normal amounts of non-ferris metal for conductors 64 and 66. The results could also be achieved by fabricating the conductors 64 and 66 from non-ferris material having greater internal resistance.

Figure 6:
FIG. 6 is a diagram of a modified A.C. voltage which may be used to power A.C. motors.

In the above discussion the enhanced characteristic (FIG. 5) was achieved during motor fabrication or selection. Such can also be achieved by selective coupling of incoming AC power to the motor 106. In FIG. 2 incoming AC power is connected to conductor 132 and 134 which are in turn connected to a power control circuit 114. An output of power control circuit 114 is used to power the motor. Power control circuit 114 selectively blocks portions of each cycle of the incoming sinusoidal AC wave form shown in FIG. 6 to the motor 106 via relay logic 104. The wave form of FIG. 6 is achieved by a "light dimmer" circuit in power control which is preset to pass a predetermined percentage e.g., 60 percent of each sine wave cycle. Energization of an AC induction motor with a wave form shown in FIG. 6 results in a characteristic as shown in FIG. 5. Greater control over the A.C. wave form applied to the motor 106 by using a power control circuit of the type described in U.S. patent application Ser. No. 10/622,214 filed 18 Jul. 2003 which is connected to microcontroller 84 via a control line 118. Such greater control might include skipping entire cycles of applied A.C. Also the wave form of FIG. 6 may be reproduced using high frequency e.g., 1 KHZ duty cycle control.

Figure 10:
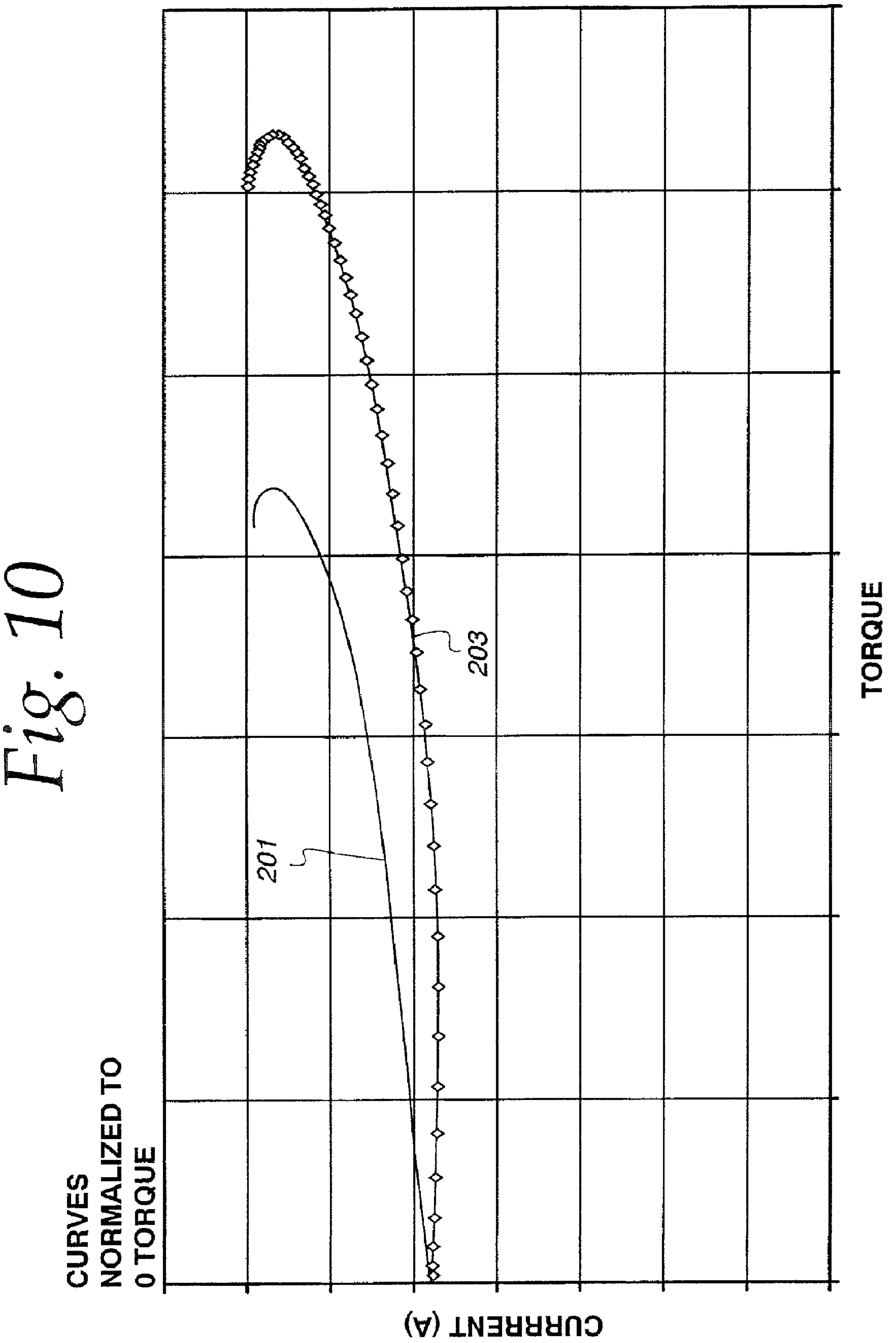
FIG. 10 is a graph of motor torque versus motor current for normal and one enhanced induction A.C. motor.

The preceding embodiment measured rotation speed of the motor to detect possible obstructions because motor speed represents present torque requirements of the motor. (See FIGS. 4 and 5) The current drawn by an induction A.C. motor also represents the present torque requirements of the motor. As the force requirements increase so does the current applied to the motor. The motor current may be sensed by an optional current sensor 130 connected to the A.C. inputs of the relay logic 104. (FIG. 2) This relationship is shown in FIG. 10 as 203 for a "normal" motor and 201 for a motor enhanced by the above described motor modifications and driving techniques. When motor current is sensed to detect possible obstructions, the enhanced characteristic 201 provides more rapid and certain obstruction detection.

While there has been illustrated and described particular embodiments of the present invention, it will be appreciated that numerous changes and modifications will occur to those skilled in the art, and it is intended in the appended claims to cover all those changes and modifications which fall within the true spirit and scope of the present invention.

The invention claimed is:

1. A barrier movement operator comprising:

an A.C. motor having a rotatable rotor connected to a barrier for movement thereof;

sensing apparatus to generate motor signals representing an operational variable of the motor;

the movement of the barrier being controlled by a controller which responds to the motor signals by selectively stopping rotation of the rotor or reversing the rotation of the rotor; and a power control arrangement which provides energizing power to the motor by receiving AC power input substantially in the form of a sine wave, the power control arrangement being effective to generate a continuously adjusted waveform of the received AC power and conduct the continuously adjusted waveform of the received AC power to the motor to enhance the sensed operational variable to torque characteristic of the motor.

2. A barrier movement operator according to claim 1 wherein the continuously adjusted waveform has at least one predetermined characteristic that is adjusted, the at least one predetermined characteristic selected from a group consisting of a frequency of the sine wave that is changed; a predetermined portion of single cycle of the sine wave that is blocked from being conducted; and at least one predetermined cycle of the sine wave that is blocked from being conducted.

3. The barrier movement operator according to claim 2 wherein the A.C. power comprises successive positive and negative cycles of current and the power control arrangement conducts a portion, but less than all of each cycle of current to the motor.

4. The barrier movement operator of claim 1 wherein the sensed operational variable is the rate of rotation of the rotor of the motor.

5. The barrier movement operator of claim 1 wherein the sensed operational variable is a driving current to the motor.

* * * * *